April 22, 1958 J. T. BARKELEW 2,831,548
EXHAUST GAS MUFFLER AND OXIDIZER
Filed Dec. 5, 1955 2 Sheets-Sheet 1
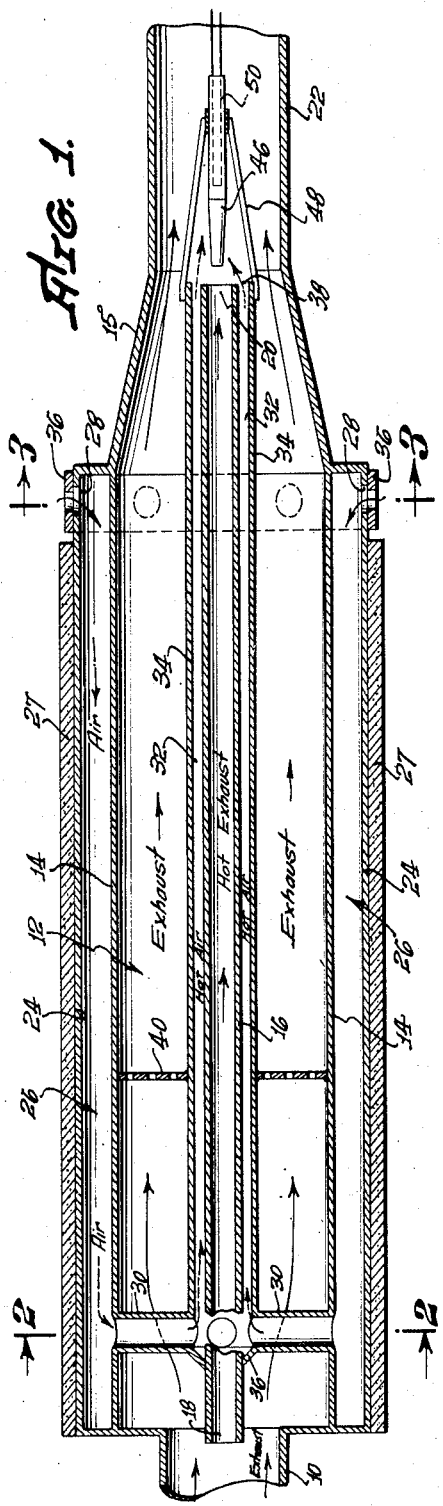
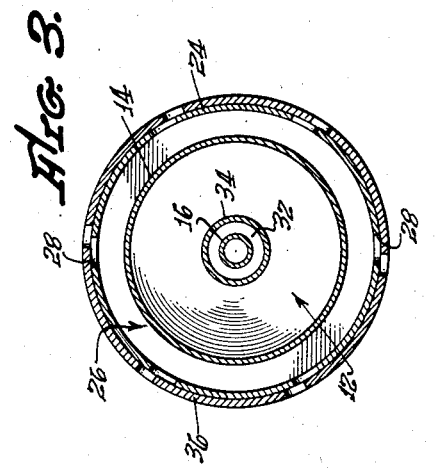
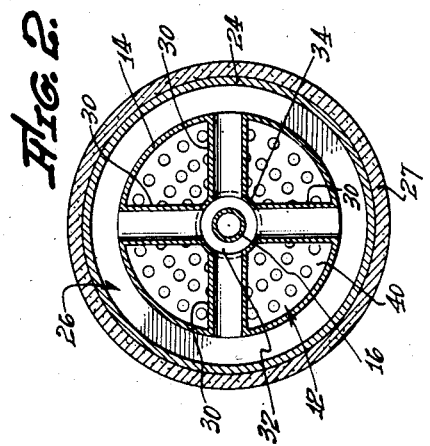
JAMES T. BARKELEW
INVENTOR.
BY
*Barkelew & Seawellsbury*
ATTORNEYS

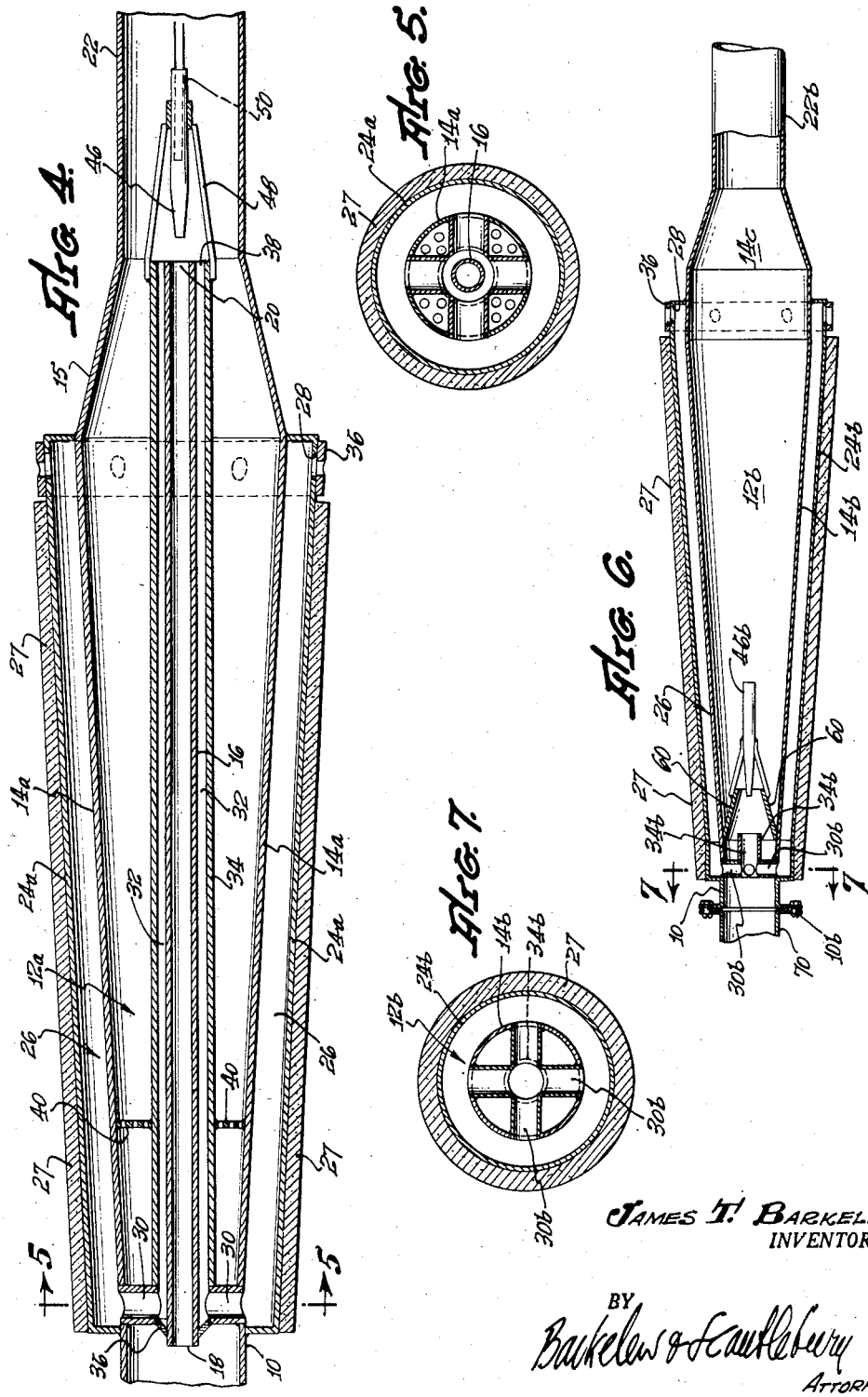

United States Patent Office 2,831,548
Patented Apr. 22, 1958

2,831,548

EXHAUST GAS MUFFLER AND OXIDIZER

James T. Barkelew, Pasadena, Calif., assignor to Barkelew Manufacturing Company, Alhambra, Calif., a corporation of California Application December 5, 1955, Serial No. 550,947

4 Claims. (Cl. 181—43)

This invention relates to certain improvements in exhaust gas mufflers and oxidizers, and, in one of its forms, particularly to improvements of the type of muffler and oxidizer set out in the application of Harry D. Barkelew, Ser. No. 435,490, filed June 9, 1954.

In exhaust devices of that type a limited portion of the hot exhaust gas from an internal combustion engine is isolated, from the main body of exhaust, in what is termed a high velocity tube to be kept hot and at relatively high pressure. A current of air is heated by heat transfer from the main body after taking off the limited portion; and that heated air is then mixed with the isolated hot gas, to cause and maintain combustion or fast oxidation of it and of the main body which is also admixed.

In such a device, and in exhaust gas mufflers and oxidizers in general, it is desirable to heat the air to the highest possible temperature, and to have the exhaust gases also at the highest possible or practicable temperature at the point of mixture and combustion. It is the general object of this invention to accomplish those desiderata.

The accompanying drawings show illustrative embodiments of the present invention, including examples in which the present improvement is applied to the type of muffler and oxidizer shown in said prior application. In those drawings:

Fig. 1 is a longitudinal central section of one example as applied to said type;

Figs. 2 and 3 are sections on lines 2—2 and 3—3 of Fig. 1;

Fig. 4 is a longitudinal central section showing a modification of the example of Fig. 1;

Fig. 5 is a section on line 5—5 of Fig. 4;

Fig. 6 is a longitudinal central section showing another example of embodiment of the invention; and Fig. 7 is a section on line 7—7 of Fig. 6.

Referring first to Figs. 1 to 3, the hot exhaust from an internal combustion engine enters, via exhaust pipe 10, one end of a muffler chamber 12 enclosed by tubular casing wall 14. A high velocity tube 16 has an open intake end 18 located in or close to pipe 10 and extends, typically, centrally through the length of chamber 12 to an open discharge end located as at 20. The casing 14, may, at its outlet end, taper down as at 15 to an outlet pipe 22. Tube 16 is preferably of a size to pass only a small portion of the whole exhaust, the main body of exhaust entering and passing through chamber 12 which allows expansion and cooling of the main body.

An air casing 24 surrounds casing 14 to provide between them an annular air heating passage 26 where the current of air, that enters at the shuttered openings 28, is in direct heat transfer relation through heat conductive wall 14 with the main body of exhaust in 12.

Air entering at 28, preferably near the outlet end of chamber 12, travels toward the inlet end of that chamber, and, at a point at or close to that end (the left hand end in Fig. 1) passes through suitable cross passages 30 to an annular passage 32 formed inside a tube 34 surrounding high velocity tube 16. Tube 34, closed at 36 at its end adjacent the intake end of 16, extends longitudinally to an outlet end as at 38 in ejector relation to the outlet end 20 of tube 16. The ejector arrangement at that point may be any suitable one.

The stream of hot gases flowing at high velocity through tube 16, relatively unexpanded and uncooled, by ejector action at 20, 38, draws a stream of air through passages 32 and 26. The volumetric flow of that stream may be adjusted by, for example, the adjustable shutter ring 36. The air flow in 26 is opposite to that of the expanding and cooling exhaust gases in 12, so that the air flowing in 26 is, after finally flowing through the cross passages 30, heated to a temperature most closely equalling the original exhaust temperature of the hot exhaust gases at the head end of 12 where they emerge from the exhaust pipe 10. The walls of cross passages 30 are preferably of heat conductive metal, so that the air is also heated in them at the head end of chamber or passage 12. To minimize expansion and cooling of the gases at the head end of 12, and thereby to increase the temperature to which the air stream in 26 and 30 is heated, an obstruction or constriction may be placed in 12; for example, a perforated diaphragm 40 near the head end of 12. Or the cross passages 30 may be made of suitable size (in the aspect of Fig. 2) to serve as such obstruction, either alone or in conjunction with such a baffle as 40. And to minimize heat loss from the air stream in 26 to the surrounding atmosphere, the casing wall 24 may be of heat insulating material, or if of metal may have an insulating jacket, as 27.

The heated air stream flowing through passage 32 surrounding tube 16 materially diminishes heat loss of the hot gases in that tube to the surrounding cooling gases in 12. To minimize heat loss from the heated air stream in passage 32 to the cooling gases in 12, tube 34 may be composed of a heat insulating material, e. g. asbestos or a suitable ceramic, or may be heat insulated. The whole result is that both the hot exhaust in tube 16 and the air in passage 32 reach their points of discharge at 20, 38 at the highest possible temperatures and preferably substantially equal temperatures. To equalize their temperatures, high velocity tube 16 may be and preferably is composed of a heat conductive metal.

Shutter 36 is adjusted preferably to provide just enough, or slightly more than just enough, hot air at 38 to complete the combustion or fast oxidation of all the remaining unburned portions of the whole exhaust body. With adjustment to that maximum amount the air stream is heated to the highest possible temperature. The ejector action at 20, 38 draws the air stream along, causes mixing of the air stream and high velocity gas stream, and the mixed stream flowing from 20, 38 at a still high velocity, draws the main body of gas through 12 by ejector action and causes admixture of all the gases and air. An actual flame of combustion may set up and be maintained directly adjacent 20, 38 where the hottest gases and air initially mix. To insure that, particularly when the engine is idling, or decelerating, a heated ignition element of any suitable character may be located in that zone. For example, the element 46 is here shown, supported by bracket bars 48 directly opposite the tube ends 20, 38. Such an element may either be heated by the hot gases, or by electrical resistance such as indicated at 50, or by both.

Fig. 4 shows a variation of the form of Fig. 1. In Fig. 4 the casing 14a, corresponding to 14 in Fig. 1, is tapered; being at its head end, where it joins exhaust pipe 10, of the same size as that pipe. The air casing 24a is correspondingly tapered. In this arrangement the exhaust passage 12a is at its head end of substantially the same size as pipe 10; so that the air stream entering the head end of passage 32 is finally heated from the main exhaust body while still at its highest temperature before any material expansion and cooling. In this form the obstructive diaphragm 40 may or may not be used, and the cross-passages 30 may also be utilized as obstructions; as in Fig. 1. Other than as above explained, the structure and functioning of Fig. 4 is the same as of Fig. 1, and the same numerals are applied.

Fig. 6 shows a further modification in which the high velocity tube of Figs. 1 and 4 is not utilized. In Fig. 6 exhaust pipe 10 delivers into the head end of casing 14b which is here shown as tapered, of the same size at its head end as pipe 10, and larger at its delivery end 14c from which the tail pipe 22b leads. Air casing 24b surrounds casing 14b as in Fig. 4. As in Figs. 1 and 4, casing wall 14b is preferably heat conductive, and casing wall 24b may be heat insulative or have insulating jacket 27. At the intake end of casing 14b where it joins exhaust pipe 10 the head end of the annular air passage communicates through cross passages 30b with a short tube 34b whose open end faces down stream, to the right in Fig. 6. As in the other figures, cross passages 30b have heat conductive walls, as may also tube 34b. A nozzle formation 60 at the delivery end of pipe 10 surrounds the open end of 34b to create a zone of high velocity and low static pressure in the exhaust gases flowing through it, to draw the air stream from tube 34b and through the heating passage 26 in a direction counter-current to the flow of expanding exhaust gases through the muffler gas passage 12b in casing 14b. The shuttered air intake 28 is located the same here as in Figs. 1 and 4.

The action of air heating is here the same as in Fig. 4; the air stream, by the time it reaches the air delivery tube 34b, being heated to substantially the initial high temperature of the exhaust in pipe 10. Cross passages 30b may be utilized as obstructions as in the other figures; and the contraction in nozzle 60 also acts to prevent gas expansion at the head end of passage 12b and immediately adjacent the head end of air passage 26 and the cross passages 30b. The whole body of hot exhaust gas is mixed with the heated air as the result of the ejector action at 60 and resulting combustion or fast oxidation takes place in the zone within 60 and immediately rear of it. To maintain combustion there, an ignition element 46b, as described for Fig. 1, may be utilized.

In all the forms here described it is desirable to have the exhaust gases enter the head end of the muffler structure as hot as practicable. To that end the devices may preferably be located close to the engine, the flange shown at 10b in Fig. 6 being for instance bolted directly to the flanged end of the engine exhaust manifold 70; or the exhaust pipe 10 leading from the exhaust manifold of the engine may be jacketed with heat insulation.

I claim:

1. In a muffler and oxidizer for exhaust gases of internal combustion engines and the like, the combustion of an elongate walled gas expansion chamber with intake and discharge ends, an exhaust pipe discharging into the intake end of said chamber, the exhaust gases flowing through said chamber from its intake to its discharge end, a longitudinally extending air passage in heat conductive relation to the exhaust chamber and coextensive in length with at least a portion of said chamber for heating air flowing through said passage, an air intake at the end of the air passage which is the closer to the discharge end of the gas chamber, the air passage having a discharge at its end which is closer to the intake end of the gas chamber, a high velocity gas tube having an open intake end at the intake end of the gas chamber, said tube being smaller than the exhaust pipe and having its intake end located in the discharge of the exhaust pipe to take a portion only of the hot gases therefrom, said tube extending longitudinally in the gas chamber and having a discharge end, an air conduit tube surrounding and longitudinally substantially coextensive with the high velocity tube and annularly spaced therefrom to form an annular air passage around the high velocity tube, said annular air passage having a discharge end substantially at the discharge end of the high velocity tube, and conduit means connecting the discharge of the first mentioned air passage with the end of the annular air passage which is the closer to the intake end of the high velocity tube.

2. The combination defined in claim 1 and in which the first mentioned air passage immediately surrounds the gas chamber.

3. The combination defined in claim 1 and in which the air conduit tube is of heat insulative material.

4. The combination defined in claim 1 and in which the connective conduit means extends across the interior of the gas chamber near its intake end and forms a partial obstruction to passage of gases through said chamber.

References Cited in the file of this patent

UNITED STATES PATENTS

| | | |
|---|---|---|
| 1,848,990 | Boyd et al. | Mar. 8, 1932 |
| 1,932,927 | Fischer | Oct. 31, 1933 |
| 2,038,567 | Ittner | Apr. 28, 1936 |